(12) United States Patent
Schmierer et al.

(10) Patent No.: US 12,134,357 B2
(45) Date of Patent: Nov. 5, 2024

(54) EXTERIOR MOUNTED CAMERA POD ADAPTER

(71) Applicant: Motherson Innovations Company Limited, London (GB)

(72) Inventors: Arne Schmierer, Stuttgart (DE); Hans-Dieter Pomparew, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 67 days.

(21) Appl. No.: 18/005,391

(22) PCT Filed: Aug. 16, 2021

(86) PCT No.: PCT/EP2021/072726
§ 371 (c)(1),
(2) Date: Jan. 13, 2023

(87) PCT Pub. No.: WO2022/034244
PCT Pub. Date: Feb. 17, 2022

(65) Prior Publication Data
US 2023/0271565 A1    Aug. 31, 2023

Related U.S. Application Data

(60) Provisional application No. 63/065,619, filed on Aug. 14, 2020.

(51) Int. Cl.
*B60R 11/04*  (2006.01)
*H04N 23/51* (2023.01)

(52) U.S. Cl.
CPC ............ *B60R 11/04* (2013.01); *H04N 23/51* (2023.01)

(58) Field of Classification Search
CPC ... B60R 2001/1253; B60R 11/04; B60R 1/04; B60R 2001/1215; B60R 1/22; H04N 23/51; H04N 5/2257
See application file for complete search history.

(56) References Cited

U.S. PATENT DOCUMENTS

| | | | |
|---|---|---|---|
| 10,232,780 B1 | 3/2019 | Francus et al. | |
| 2012/0263445 A1* | 10/2012 | Beasley | F16M 13/02 396/428 |
| 2017/0225628 A1 | 8/2017 | Aich et al. | |
| 2019/0351840 A1* | 11/2019 | Kasarla | B60R 11/04 |
| 2020/0010021 A1* | 1/2020 | Urata | B60R 11/00 |
| 2022/0032858 A1* | 2/2022 | LaCross | H04N 23/50 |

FOREIGN PATENT DOCUMENTS

| | | |
|---|---|---|
| DE | 102016110748 | 6/2017 |
| KR | 2004-68840 | 9/2013 |

OTHER PUBLICATIONS

International Search Report and Written Opinion dated Dec. 13, 2021 of International application No. PCT/EP2021/072726.

* cited by examiner

*Primary Examiner* — Xi Wang
(74) *Attorney, Agent, or Firm* — Jones Day

(57) ABSTRACT

The present disclosure refers to a camera pod adapter assembly, comprising a mounting side; at least one first fastener; at least one mounting bracket; and wherein the at least one first fastener is attached to the at least one mounting bracket through an aperture in the adapter assembly.

6 Claims, 13 Drawing Sheets

EXTERIOR MOUNTED CAMERA POD ADAPTER

CROSS-REFERENCE TO RELATED APPLICATIONS

This application is a National-Stage Entry of International Patent Application No. PCT/EP2021/072726 filed on Aug. 16, 2021, which claims to benefit of priority to U.S. Provisional Patent Application No. 63/065,619 filed on Aug. 14, 2020, each of which is incorporated by reference in its entirety for all purposes.

BACKGROUND

1. Field

The present disclosure relates a camera pod adapter assembly. In particular, the present disclosure relates to the mounting of a camera pod to the exterior of a vehicle. It also refers to a vehicle with such a camera pod adapter assembly.

2. Related Art

Current motor vehicle rear view mirror systems which enable the driver to view indirect fields of view are being replaced by camera systems. In order to monitor the required viewing zones, the camera system must be arranged in a specific layout in regards to frontal position and lateral spacing from the vehicle. The specified mounting location of the camera pod adapter assembly and it's method of installation may present disadvantages in the mounting process.

SUMMARY

It is the object of this disclosure to further develop the existing camera pod mountings to overcome the problems of the prior art.

The object is achieved by the provision of the camera pod adapter assembly for attaching a camera pod assembly to a vehicle including a mounting side; at least one first fastener, at least one mounting bracket, and where the at least one first fastener is attached to the at least one mounting bracket through an aperture in the adapter assembly. The adapter assembly is provided with a mounting side for attachment of a camera pod assembly, and a vehicle side for attachment to a vehicle. The adapter assembly is further provided with at least one fastener and at least one mounting bracket which cooperatively fix the adapter assembly to the attachment portion of a vehicle.

Implementations of the inventive camera pod adapter assembly can be accomplished in many ways, e.g. by one or more of the following features. The adapter assembly may have the at least one mounting bracket has a first state and a second state. The at least one first fastener is operable to move the at least one mounting bracket from the first state to the second state. The at least one first fastener is also operable to move the at least one mounting bracket from the second state to the first state. The at least one first aperture is provided substantially perpendicular to the at least one mounting bracket; and the at least one second fastener is operable to be inserted through the at least one first aperture to fix the adapter assembly.

One general aspect of the adapter assembly may include at least one first aperture and an at least one second fastener. wherein one embodiment the at least one first aperture of the camera pod adapter assembly provided herein is provided substantially perpendicular to the at least one mounting bracket. The at least one second fastener is operable to be inserted through the at least one first aperture to fix the adapter assembly.

It should be noted that the features set out individually in the following description can be combined with each other in any technically advantageous manner and set out other forms of the present disclosure. The description further characterizes and specifies the present disclosure in particular in connection with the figures.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

Figure 1:
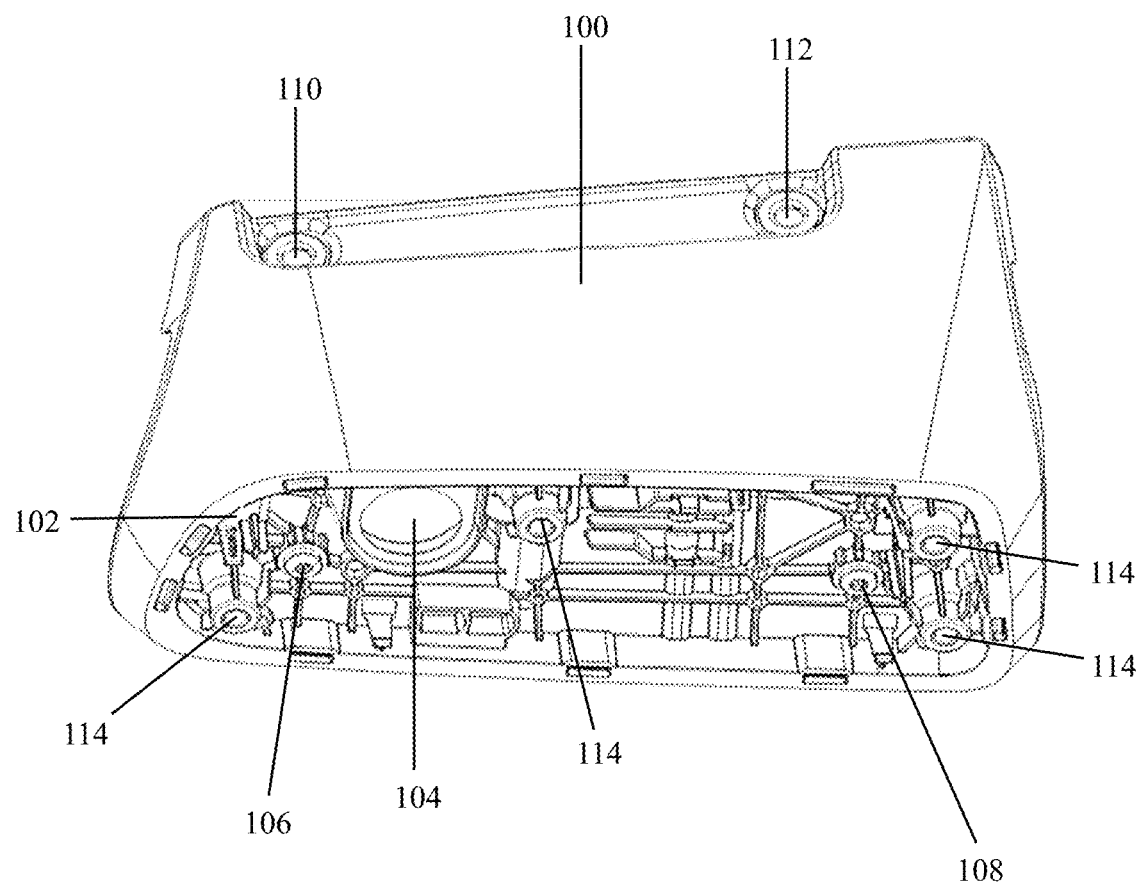
FIG. 1 illustrates an isometric view of a camera pod adapter in accordance with aspects of the present disclosure.

The following description is merely exemplary in nature and is not intended to limit the present disclosure, application, or uses. It should be understood that throughout the drawings, corresponding reference numerals indicate like or corresponding parts and features.

FIG. 1 illustrates an isometric view of a camera pod adapter in accordance with aspects of the present disclosure. In FIG. 1, the mounting side 102 of camera pod adapter 100 is shown, which provides a mounting point for a camera pod system (not shown). A camera pod system may be attached to the mounting side 102 of camera pod adapter 100 via camera pod system mount 114. Aperture 104 provides an opening for a wiring harness (not shown) to pass from the vehicle through camera pod adapter 100 to a camera pod system. In other embodiments, the camera pod system may come equipped with an integrated self-cleaning system which would require a tube for a cleaning fluid, which could be passed through aperture 104. Screw 106 and screw 108 are provided and can be turned in order to tighten mounting bracket 116 and mounting bracket 118 respectively (shown in FIG. 2). Aperture 110 and aperture 112 provide openings through which a fastener (not shown) may be insert to secure camera pod adapter 100 to the exterior of a vehicle. In this embodiment, screw 106 and screw 108 are depicted as screws, however in other embodiments, screw 106 and screw 108 may be any other known fastener or fastening method.

Figure 2:
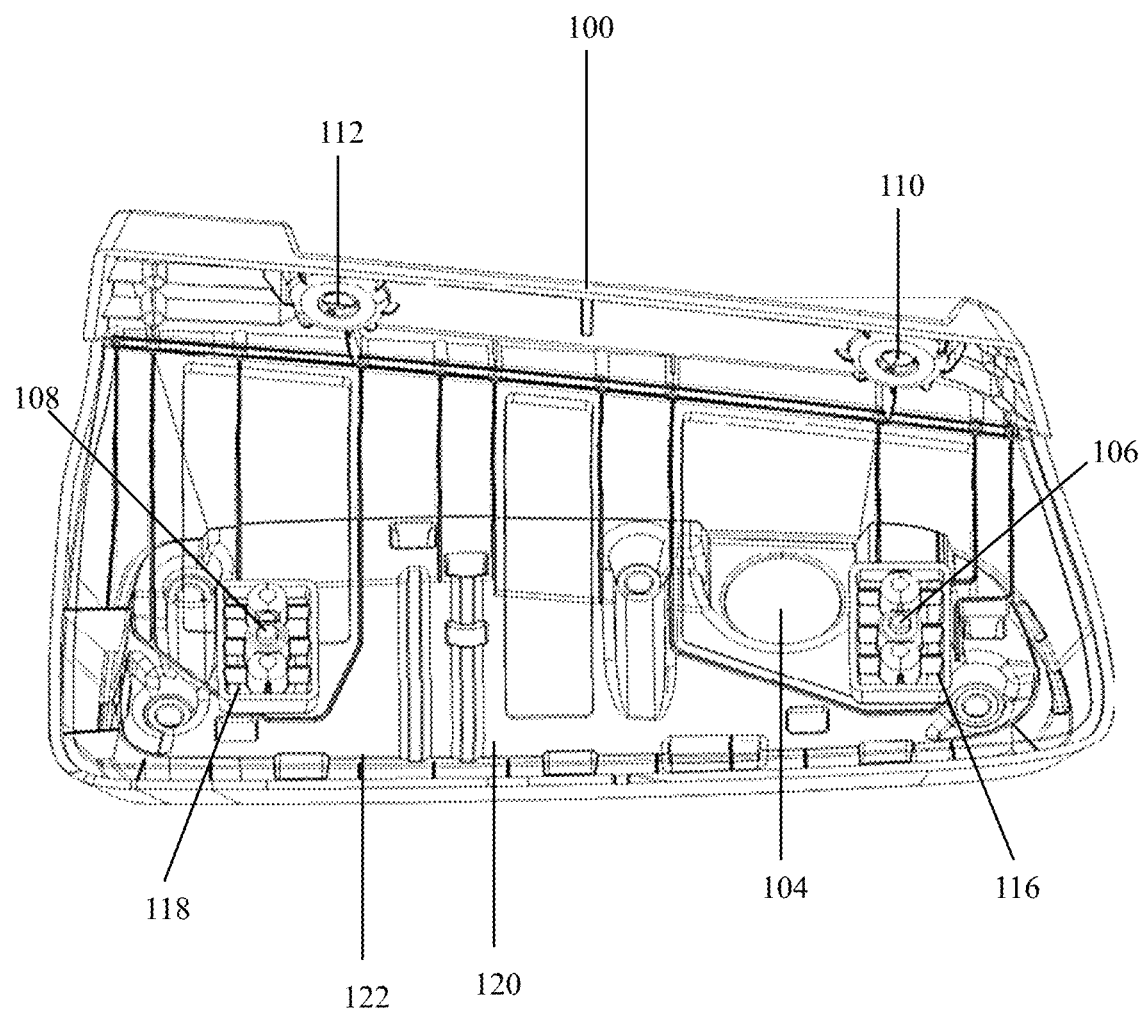
FIG. 2 illustrates an isometric view of a camera pod adapter in accordance with aspects of the present disclosure.

FIG. 2 illustrates an isometric view of a camera pod adapter in accordance with aspects of the present disclosure. In FIG. 2, the vehicle side 120 of camera pod adapter 100 is shown. Mounting bracket 116 comprises a threaded insert in which screw 106 is inserted. When screw 106 is turned clockwise, it will pull mounting bracket 116 towards camera pod adapter 100, and when the screw 106 is turned counter-clockwise, it will push mounting bracket 116 away from camera pod adapter 100. Similarly, mounting bracket 118 comprises a threaded insert in which screw 108 is inserted such that when the screw 108 is turned clockwise the mounting bracket 118 is pulled towards camera pod adapter 100 and when screw 108 is turned counter-clockwise the mounting bracket 118 is pushed away from camera pod adapter 100. It should be noted that the described rotation of screw 106 and screw 108 are exemplary in nature and that the directions could easily be reversed. Further, it should be obvious to anyone skilled in the art that any number of different fastening methods could be used to retract or extend each of mounting bracket 116 and mounting bracket 118 away or towards camera pod adapter 100.

Figure 6:
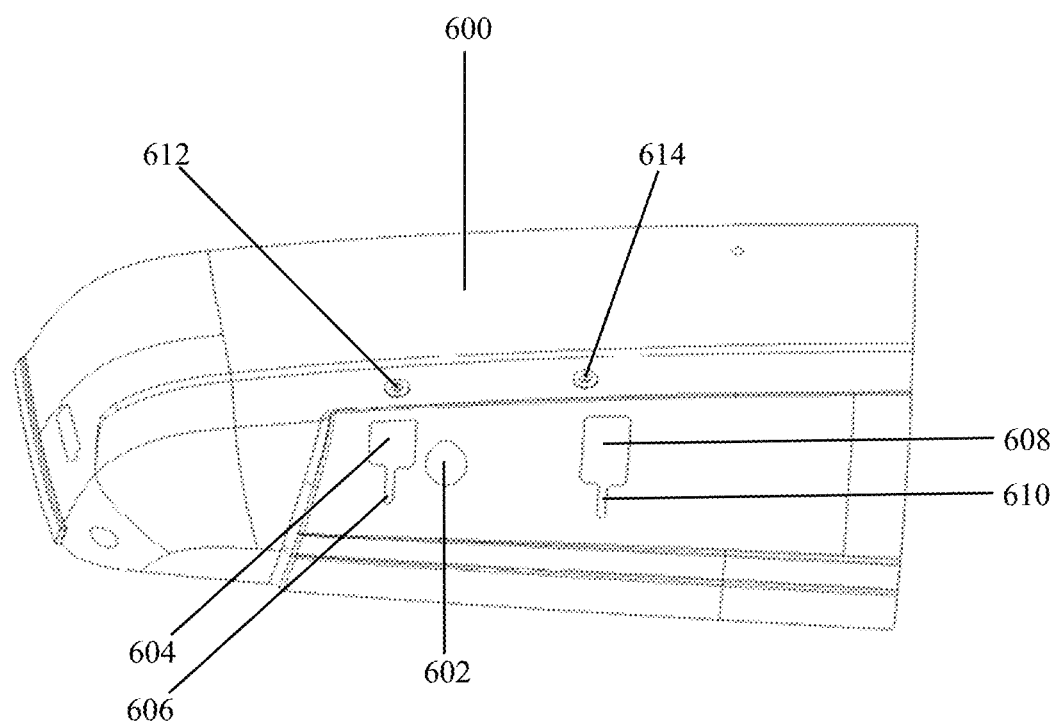
FIG. 6 illustrates an isometric view of an attachment portion of a vehicle for the attachment of a camera pod adapter in accordance with aspects of the present disclosure.

A gasket 122 is arranged such that it may provide a seal between vehicle side 120 of camera pod adapter 100 and the surface of attachment portion 600 of FIG. 6. In this example variation, camera pod adapter 100 comprises two mounting brackets, mounting bracket 116 and mounting bracket 118. However, in other example variations camera pod adapter 100 requires at least one or more mounting brackets.

Figure 3:
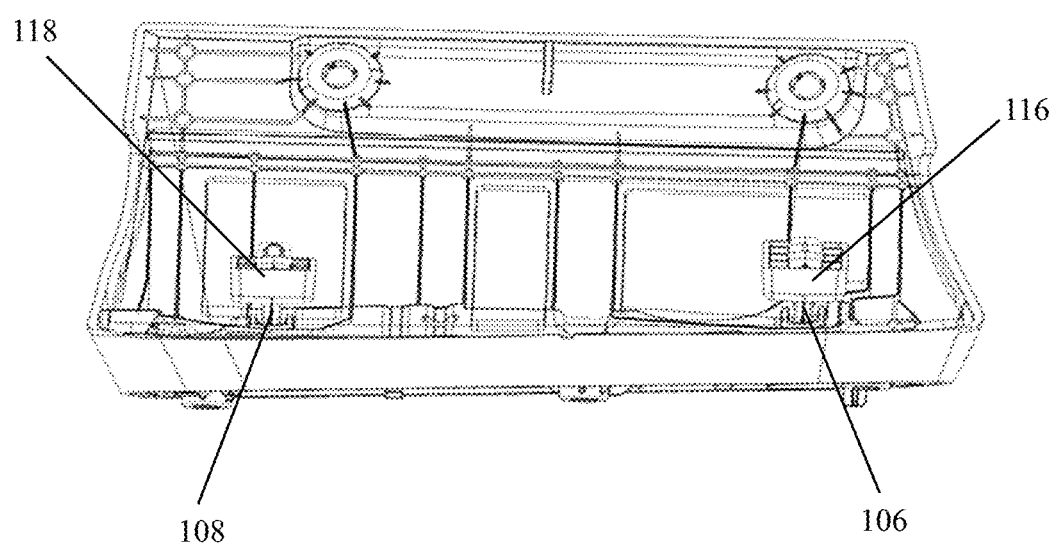
FIG. 3 illustrate a side view of the mounting brackets of a camera pod adapter in accordance with aspects of the present disclosure.
Figure 4:
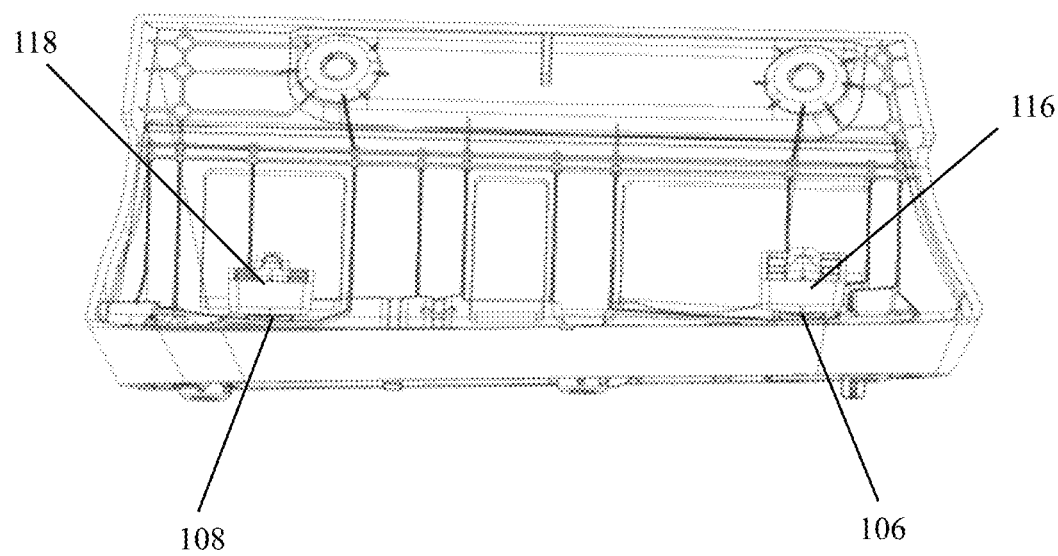
FIG. 4 illustrate a side view of the mounting brackets of a camera pod adapter in accordance with aspects of the present disclosure.

FIG. 3 and FIG. 4 illustrate a side view of the mounting brackets of a camera pod adapter in accordance with aspects of the present disclosure. FIG. 3 depicts screw 106 and screw 108 having been rotated such that mounting bracket 116 and mounting bracket 118 are in a first state in which they are extended the maximum distance away from camera pod adapter 100. FIG. 4 depicts screw 106 and screw 108 having been rotated such that mounting bracket 116 and mounting bracket 118 are in a second state in which they are retracted such that they are a minimum distance away from camera pod adapter 100, i.e. in a position contrary to the first state.

Figure 5:
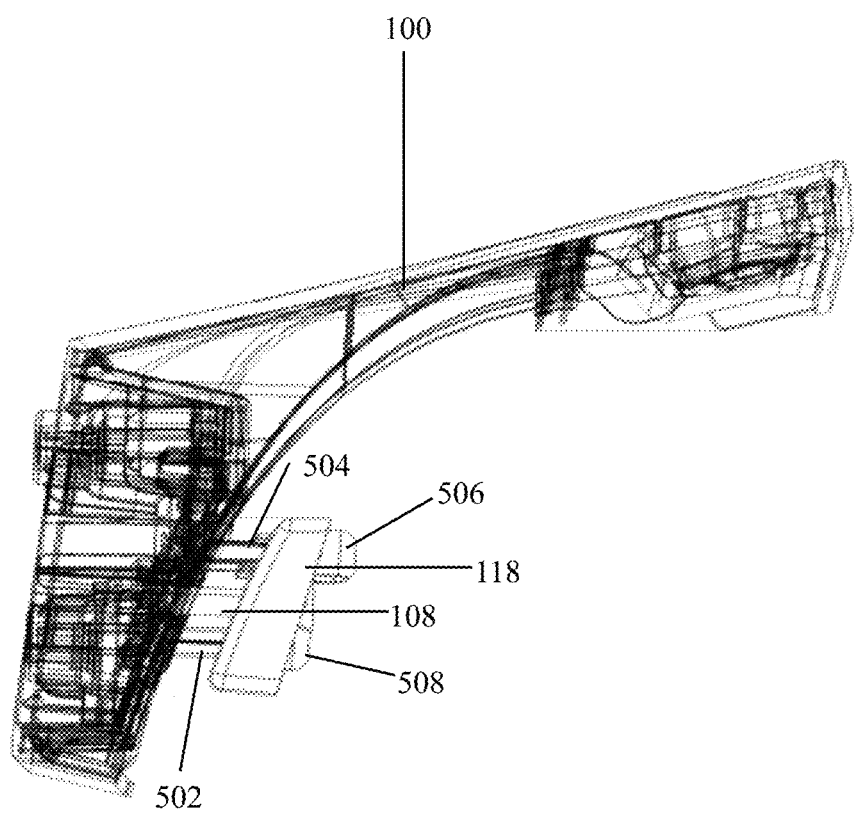
FIG. 5 depicts a close up view of a mounting bracket and camera pod adapter in accordance with aspects of the present disclosure.

FIG. 5 depicts a close up view of a mounting bracket and camera pod adapter in accordance with aspects of the present disclosure. Mounting bracket 118 is attached to screw 108 which may be used to move mounting bracket 118 from a first state to a second state or from a second state to a first state. As shown, camera pod adapter 100 additionally includes guide 502 and guide 504. Guide 502 and guide 504 are fixed to camera pod adapter 100 such that guide 502 extends into aperture 506 and guide 504 extends into aperture 508, where aperture 506 and aperture 508 are located on mounting bracket 118. Guide 502 and guide 504 stabilize the mounting bracket 118 so that it remains fixed in place during the installation of camera pod adapter 100 which will be discussed further with additional reference to FIGS. 6-13. Mounting bracket 116 also has guides and apertures similar to guide 502, guide 504, aperture 506, and aperture 508 in form and function. However for the sake of clarity, only the exemplary guides used to stabilize mounting bracket 118 are shown in subsequent figures.

FIG. 6 illustrates an isometric view of an attachment portion 600 of a vehicle for the attachment of a camera pod adapter 100 in accordance with aspects of the present disclosure. Attachment portion 600 may be located on a vehicle where it is desired to attach a camera pod. Aperture 602 provides an opening for a wiring harness or tube (not shown) to pass from the vehicle through camera pod adapter 100 to a camera pod system. Aperture 604 provides an opening through which the mounting bracket 118 may be inserted and aperture 608 provides an opening through which the mounting bracket 116 may be inserted. Slot 606 is connected to the aperture 604 and provides a space for the screw to be adjusted. The slot 610 is connected to aperture 608 in order to provide a space for the adjustment of screw 106. A fastener (not shown) may be inserted through aperture 110 of the camera pod adapter 100 and into aperture 612 as well as through aperture 112 of the camera pod adapter 100 and into aperture 614 in order to fix camera pod adapter 100 to attachment portion 600.

Figure 7:
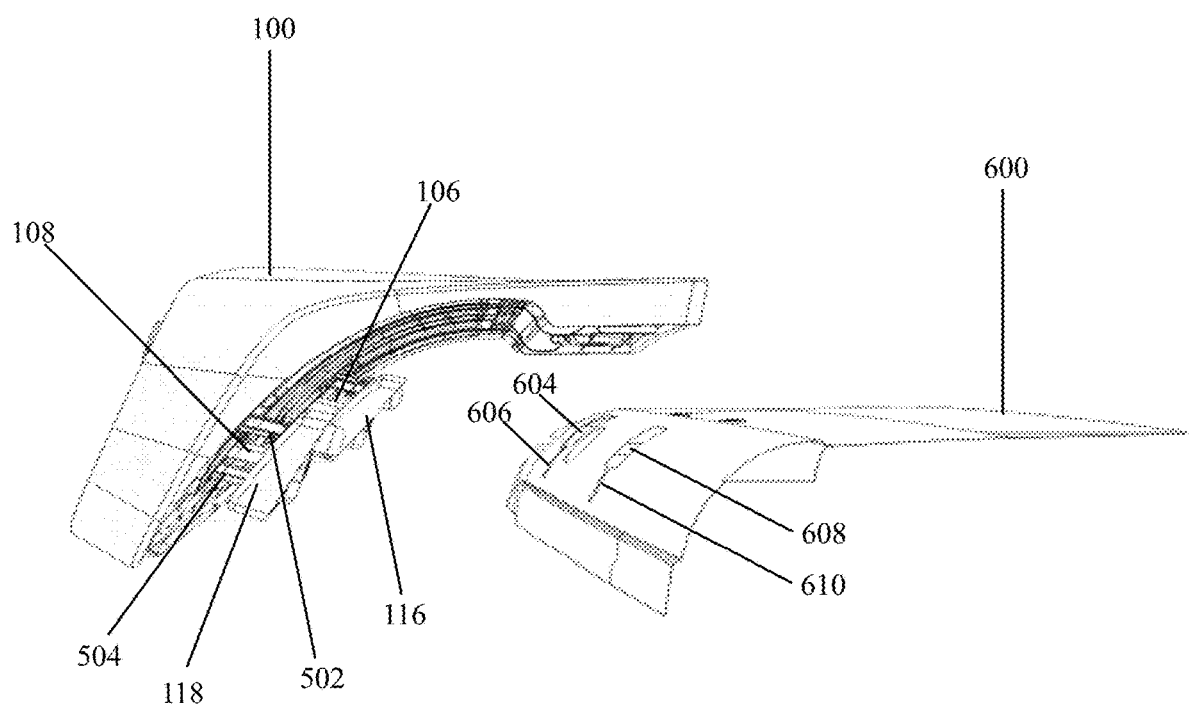
FIG. 7 illustrates a perspective view of the alignment of a camera pod adapter and an attachment portion in accordance with aspects of the present disclosure.
Figure 8:
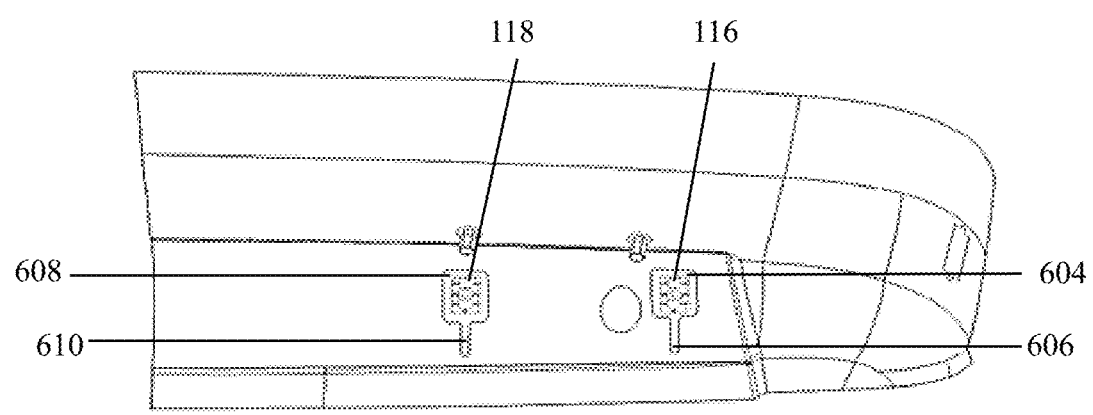
FIG. 8 illustrates a perspective view of the alignment of mounting brackets of a camera pod adapter with an attachment portion in accordance with aspects of the present disclosure.
Figure 9:
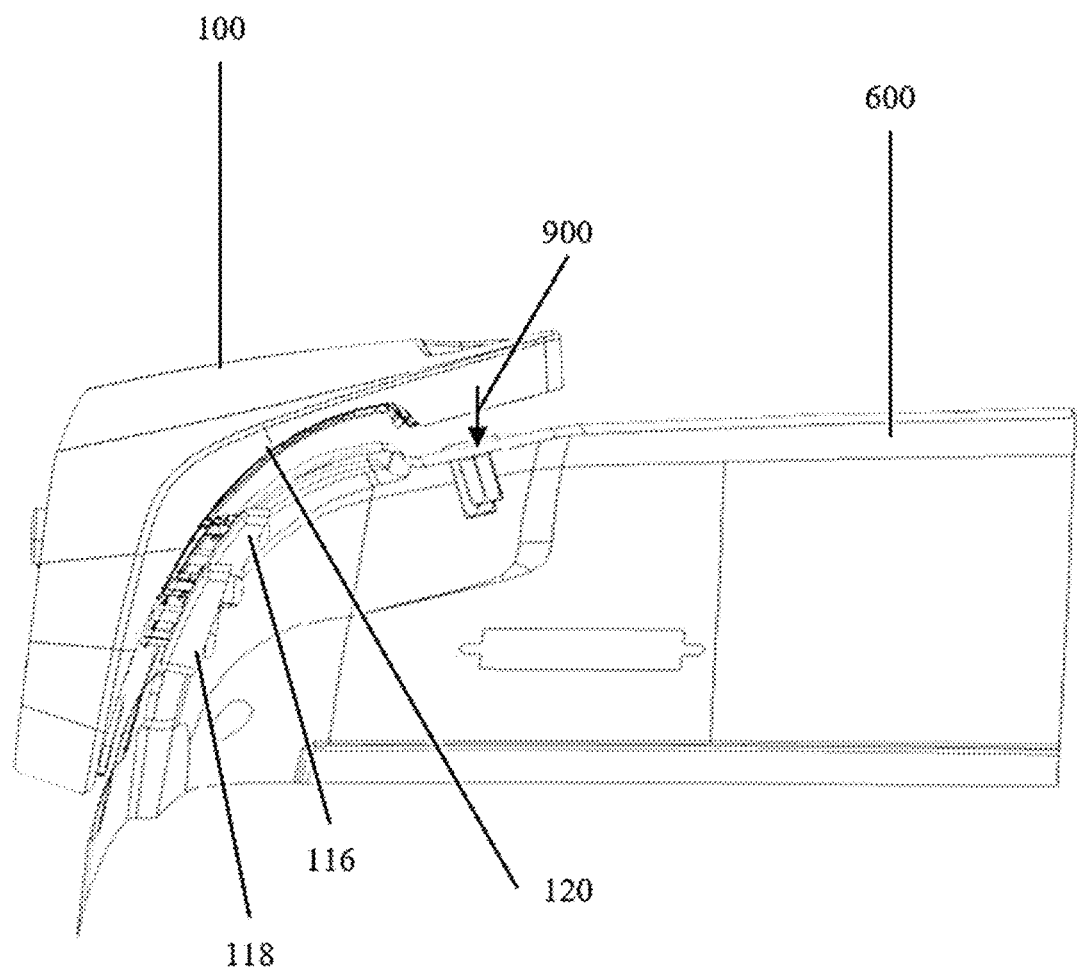
FIG. 9 illustrates a side view of a camera pod adapter being attached to an attachment portion of a vehicle in accordance with aspects of the present disclosure.

FIG. 7 illustrates a perspective view of the alignment of camera pod adapter 100 and attachment portion 600 in accordance with aspects of the present disclosure. To install the camera pod adapter 100 at attachment portion 600, the mounting bracket 116 and the mounting bracket 118 must be in a first state in which they are the maximum distance away from camera pod adapter 100. In the first state, the mounting bracket 116 is aligned such that it is able to be inserted through aperture 604 and the mounting bracket 118 is aligned such that it is able to be inserted through aperture 608. The alignment of the mounting bracket 116 to aperture 604 and the mounting bracket 118 to aperture 608 can be seen in more clearly in FIGS. 8-9. At the time the mounting bracket 116 is inserted through aperture 604 and mounting bracket 118 is inserted through aperture 608, there is a distance between camera pod adapter 100 and mounting the attachment portion 600, which is shown by distance 900 in FIG. 9.

Figure 10:
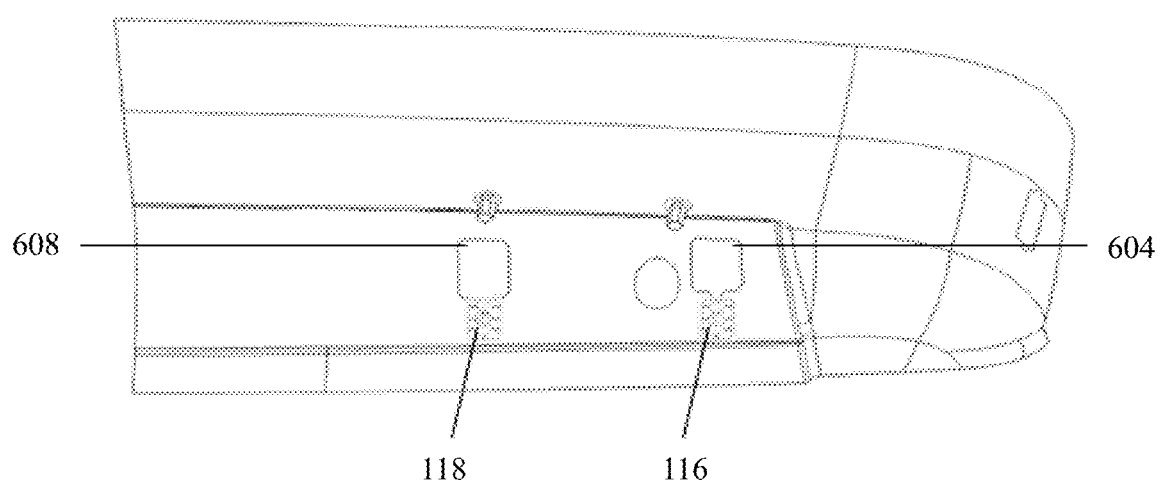
FIG. 10 illustrates a perspective view of the alignment of mounting brackets of a camera pod adapter with an attachment portion in accordance with aspects of the present disclosure.
Figure 11:
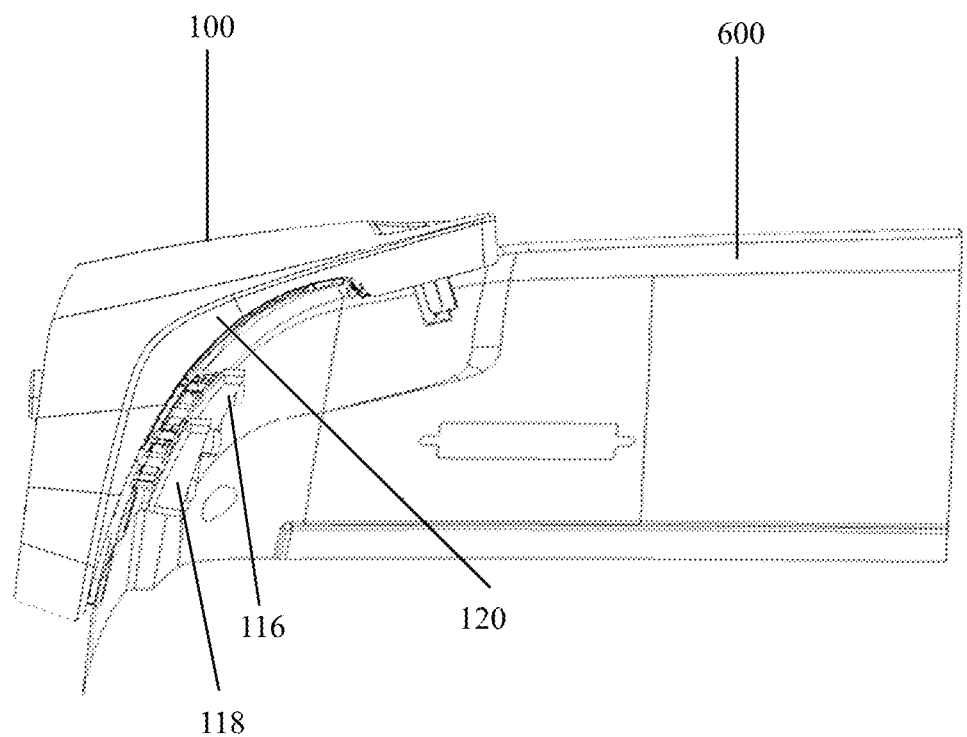
FIG. 11 illustrates a side view of the mounting brackets of a camera pod adapter in a first state in accordance with aspects of the present disclosure.

Aligning the mounting brackets 116, 118 of camera pod adapter 100 to pass through their respective apertures means that a portion of screw 106, guide 502, and guide 504 will pass through aperture 604 and that a portion of screw 108 and its respective guides will pass through aperture 608. Once the mounting bracket 116 and the mounting bracket 118 described above have been extended through their respective apertures, camera pod adapter 100 may be fit onto attachment portion 600. To fit camera pod adapter 100 to attachment portion 600, screw 106, guide 502, and guide 504 are repositioned from aperture 604 into slot 606 while simultaneously screw 108 and the respective guides of mounting bracket 116 are repositioned from aperture 608 into slot 610 allowing vehicle side 120 of camera pod adapter 100 to rest against the surface of attachment portion 600 as shown in FIGS. 10-11. The length of slot 606 and slot 610 corresponds to distance 900 of FIG. 9 such that when camera pod adapter 100 is moved towards attachment portion 600, distance 900 reduces until the camera pod adapter 100 contacts the attachment portion 600. The distance 900 is approximately zero at the point of contact.

In this manner, the installation of the camera pod adapter 100 to the attachment portion 600 is performed easily in comparison to the current state of the art. Conventional adapters do not comprise the mounting bracket 116 or the mounting bracket 118 and generally only include screw 106 and screw 108. During the installation process, the camera pod adapter 100 must be held in place while screw 106 and screw 108 are adjusted such that they line up with their respective apertures on attachment portion 600. This can be difficult operation for a person to perform since one hand is used to hold camera pod adapter 100 in place. The alignment and turning of screw 106 and screw 108 must be done with a single free hand while simultaneously holding a screwdriver, drill, or other means of rotating the screw 106 and the screw 108 into their respective apertures.

As illustrated in FIG. 11, once vehicle side 120 of camera pod adapter 100 is brought against the surface of attachment portion 600, screw 106 and a screw 108 are turned in order to move mounting bracket 116 and mounting bracket 118 from a first state to a second state where they are a minimum distance away from camera pod adapter 100. The mounting bracket 116 and the mounting bracket 118 are translated towards camera pod adapter 100 when moving from the first state to the second state. The camera pod adapter 100 is translated against the surface of attachment portion 600 by moving screw 106, guide 502, and guide 504 into slot 606 as well as screw 108 and the respective guides of mounting bracket 116 into slot 610. Thereby, the mounting bracket 116 and the mounting bracket 118 are no longer aligned with aperture 604 or aperture 608 as shown previously in FIG. 10. When in the second state, the mounting bracket 116 and the mounting bracket 118 abut against the inner surface of attachment portion 600, fixing camera pod adapter 100 in place.

Figure 12:
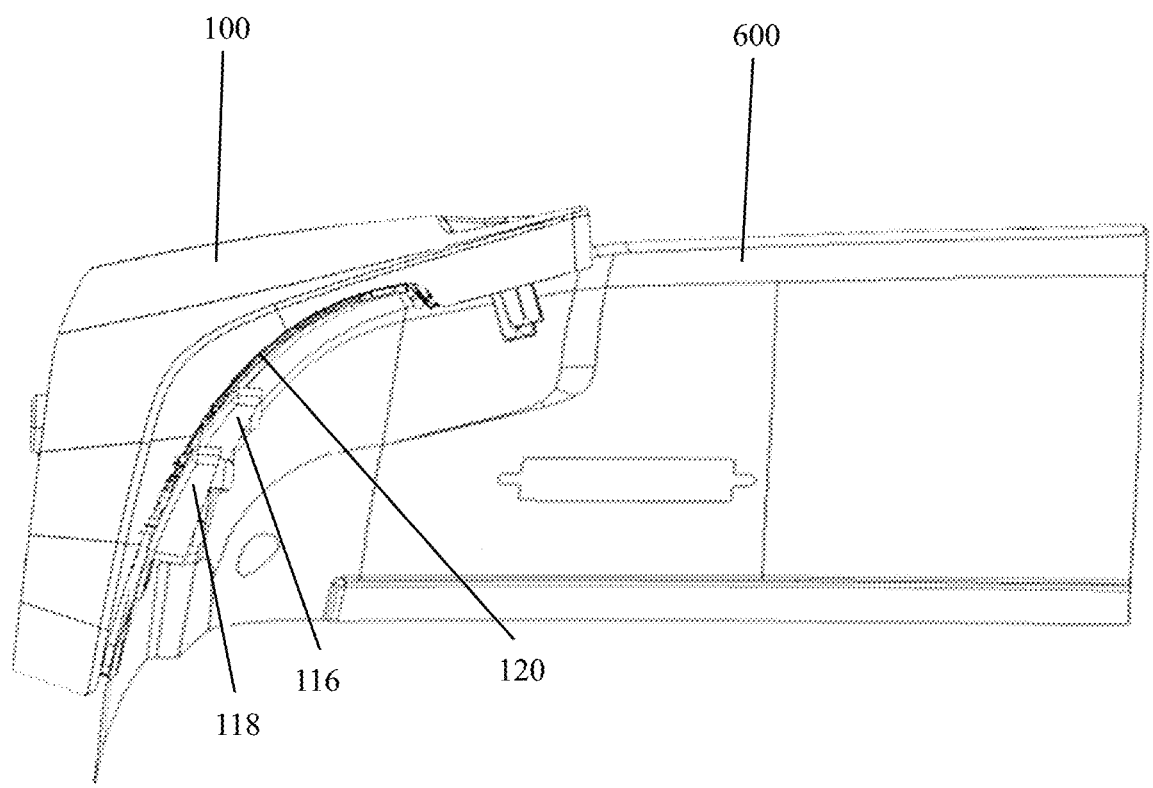
FIG. 12 illustrates a side view of the mounting brackets of a camera pod adapter in a second state in accordance with aspects of the present disclosure.
Figure 13:
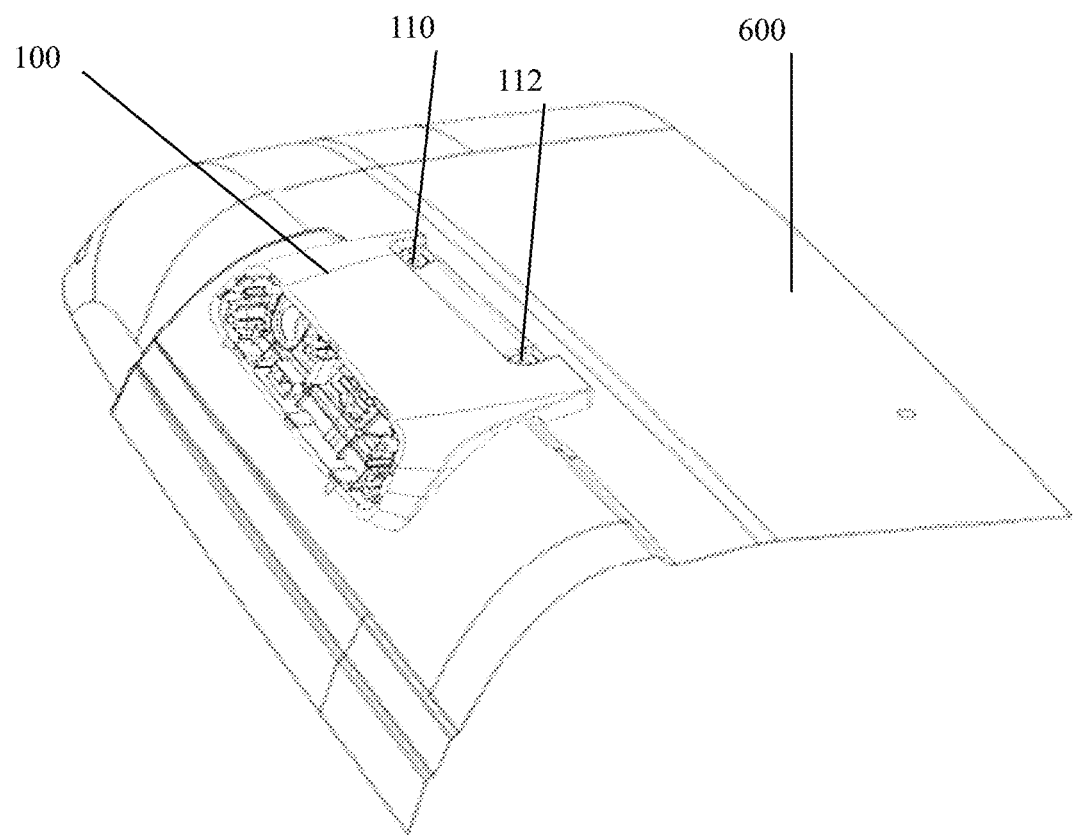
FIG. 13 illustrates a perspective view of a camera pod adapter installed at an attachment portion of a vehicle in accordance with aspects of the present disclosure.

FIG. 12 illustrates a camera pod adapter being attached to an attachment portion of a vehicle in accordance with aspects of the present disclosure. After mounting bracket 116 and mounting bracket 118 are in their second state and are capable to hold the camera pod adapter 100 against attachment portion 600, a fastener (not shown) may be insert through aperture 110 (FIG. 2) into aperture 612 (FIG. 6) and through aperture 112 (FIG. 2) into aperture 614 (FIG. 6) and then tightened in order to secure camera pod adapter 100 to attachment portion 600. The insertion of fasteners through aperture 110 and aperture 112 into aperture 612 and aperture 614 secures camera pod adapter 100 along an axis substantially perpendicular to that of mounting bracket 116 and mounting bracket 118. The mounting bracket 116 and the mounting bracket 118 secure camera pod adapter 100 by applying force against attachment portion 600 adjacent to slot 606 and slot 610. However, if only mounting bracket 116 and mounting bracket 118 are used, it would be possible to remove camera pod adapter 100 by applying an upward force relative to the camera pod adapter 100. The use of fasteners insert through aperture 110 into aperture 612 and through aperture 112 into aperture 614 prevents camera pod adapter 100 from being removed from attachment portion 600 by the application of an upward force.

As each of the fasteners are inserted through aperture 110 and aperture 112 along with mounting bracket 116 and mounting bracket 118 being adjusted into a second state, the gasket 122 is compressed between camera pod adapter 100 and the outer surface of attachment portion 600. Once fully compressed, the gasket 122 is able to seal any openings between camera pod adapter 100 and attachment portion 600 in order to prevent the intrusion of contaminants from the atmosphere external to the camera pod adapter to enter into the equipped vehicle.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the invention disclosed in the foregoing description, in the drawings and in the claims can be essential both individually and in any combination for the implementation of the invention in its various embodiments.

REFERENCE SIGN LIST

100—Camera Pod Adapter
102—Mounting Side
104—Aperture
106—Screw
108—Screw
110—Aperture
112—Aperture
114—Mount
116—Mounting Bracket
118—Mounting Bracket
120—Vehicle Side
122—Gasket
502—Guide
504—Guide
506—Aperture
508—Aperture
600—Attachment Portion
602—Aperture
604—Aperture
606—Slot
608—Aperture
610—Slot
612—Aperture
614—Aperture
900—Distance

The invention claimed is:

1. A camera pod adapter assembly, comprising:
   a mounting side;
   at least one first fastener; and
   at least one mounting bracket;
   wherein the at least one first fastener is attached to the at least one mounting bracket through an aperture in the camera pod adapter assembly,
   wherein the at least one mounting bracket has a first state and a second state,
   wherein the at least one first fastener is operable to move the at least one mounting bracket from the first state to the second state, and wherein the at least one first fastener is operable to move the at least one mounting bracket from the second state to the first state, and
   wherein the camera pod adapter assembly is moved towards an attachment portion on the vehicle from the first to the second state until the camera pod adapter assembly fixedly contacts the attachment portion.

2. The camera pod adapter assembly of claim 1, wherein in the first state the at least one mounting bracket is extended a maximum distance, and wherein in the second state the at least one mounting bracket is retracted to a minimum distance.

3. The camera pod adapter assembly of claim 1, further comprising at least one first aperture and an at least one second fastener, wherein the at least one first aperture is provided substantially perpendicular to the at least one mounting bracket, and wherein the at least one second fastener is operable to be insert through the at least one first aperture to fix the adapter assembly.

4. The camera pod adapter assembly of claim 3, further comprising at least one guide extending into the at least one first aperture to stabilize the at least one mounting bracket so that the at least one mounting bracket remains fixed in place during the installation of camera pod adapter.

5. The camera pod adapter assembly of claim 1, wherein further a gasket is arranged to provide a seal between a vehicle side of the camera pod adapter assembly and a surface of an attachment portion located on a vehicle.

6. A vehicle comprising a camera pod adapter assembly of claim 1.

* * * * *